US007194218B2

(12) United States Patent
Kondo

(10) Patent No.: US 7,194,218 B2
(45) Date of Patent: Mar. 20, 2007

(54) IMAGE FORMING APPARATUS CONTROLLING PERIPHERAL DEVICE, METHOD FOR INSTALLING CONTROL PROGRAM, INSTALLATION PROGRAM, AND RECORDING MEDIUM THEREOF

(75) Inventor: Masao Kondo, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 11/007,189

(22) Filed: Dec. 9, 2004

(65) Prior Publication Data

US 2005/0102439 A1    May 12, 2005

Related U.S. Application Data

(63) Continuation of application No. 10/103,718, filed on Mar. 25, 2002, now Pat. No. 6,963,698.

(30) Foreign Application Priority Data

Mar. 30, 2001  (JP)  ............................... 2001-98297

(51) Int. Cl.
*G03G 15/00*  (2006.01)
(52) U.S. Cl. .............................. 399/80; 399/12; 399/13
(58) Field of Classification Search .................... 399/8, 399/12, 13, 110, 111, 119, 262, 24, 25, 27
See application file for complete search history.

(56) References Cited

U.S. PATENT DOCUMENTS 5,870,610 A * 2/1999 Beyda ........................ 717/173
6,567,860 B1 * 5/2003 Maxwell et al. ............ 719/327

FOREIGN PATENT DOCUMENTS

JP  2000-207153   7/2000
JP  2001-520787   10/2001

* cited by examiner

*Primary Examiner*—Hoang Ngo
(74) *Attorney, Agent, or Firm*—Buchanan Ingersoll & Rooney PC

(57) ABSTRACT

A printer determines the condition of connection with a peripheral device. When detecting a paper ejector is connected, the printer reads out the model name and the serial number, for identifying the paper ejector, stored in a memory, and transmits the model name and the serial number to a server connected to a network. Then, the printer receives a program for controlling the paper ejector from the server, and writes the received control program into a rewritable nonvolatile memory. The printer executes the control program to thereby control the peripheral device connected to the printer.

12 Claims, 6 Drawing Sheets

Fig. 2

| Production Information | | | Operation History | | | | | Control Information | |
|---|---|---|---|---|---|---|---|---|---|
| Model | Serial No. | Firmware Version | Mode A | | Mode B | | | Control Parameter | Contorol Mode |
| | | | Number of Operation Time | Error Status | Number of Operation Time | Error Status | | | |
| Printer A | 123456 | Ver. 4.01 | 12580 90009121 | 2999 | 6789 300023 | 1256 | | C101-2458 | A-ON |
| | | | | | | | | C102-1238 | B-OFF |
| | | | | | | | | ...... | C-ON |
| Paper Ejector A | 234567 | Ver. 5.01 | | | | | | ...... | |
| | | | | | | | | C399-2490 | D-Prior |

Fig. 3

| 9 | |
|---|---|
| Image Processing Program | — 51 |
| Communicating with Server Program | — 52 |
| Information (Model etc,) Transmission Program | — 53 |
| Firmware Download Program | — 54 |
| System Requirement Data Transmitting/Receiving Program | — 55 |
| Image Data Transmitting/Receiving Program | — 56 |
| Status Transmitting/Receiving Program | — 57 |
| Engine Interface Program | — 58 |
| Others | — 59 |

Fig. 4

| 15 | |
|---|---|
| Engine Control Program | — 61 |
| Paper Ejector Interface Program | — 62 |
| Paper Ejector Control Program | — 63 |
| Controller Interface Program | — 64 |
| System Requirements Data | — 65 |
| Others | — 66 |

IMAGE FORMING APPARATUS CONTROLLING PERIPHERAL DEVICE, METHOD FOR INSTALLING CONTROL PROGRAM, INSTALLATION PROGRAM, AND RECORDING MEDIUM THEREOF

This application is a continuation of application Ser. No. 10/103,718 filed Mar. 25, 2002 and is based on Application No. 2001-098297 filed in Japan.

BACKGROUND OF THE INVENTION

1. Field of the Invention

The present invention relates to an image forming apparatus, an installation program, a computer-readable recording medium storing the installation program, and an installation method. More particularly, the present invention relates to an image forming apparatus to which a peripheral device such as a paper ejector is connectable and that controls the connected peripheral device, or an installation program for installing the control program for controlling the connected peripheral device, a computer-readable recording medium storing the installation program, and an installation method for installing the control program.

2. Description of the Related Art

Conventionally, to image forming apparatuses such as printers, copiers and facsimiles, a paper ejector having a sorter function or a stapler function is connected as a peripheral device. An instruction to control the peripheral device is input from an input device provided on the printer. In response to the input instruction, a controller provided in the printer controls the peripheral device.

Normally, the number of kinds of peripheral devices connectable to a printer is not limited to one but a peripheral device selected from among multiple kinds of peripheral devices is connected at the user's request. Therefore, it is necessary that the control programs for controlling all the connectable peripheral devices be prestored in the printer. When the control programs for controlling all the connectable peripheral devices are not stored, a read-only memory (ROM) storing the control program for controlling the connected peripheral device is changed every time a different peripheral device is connected. By doing this, the control program for controlling the peripheral device is installed in the printer.

Japanese Laid-open Patent Application No. 2000-207153 discloses to download the control programs of the printer from a host computer connected to the printer when the printer is activated. In this art, the control programs downloaded from the host computer include almost all the programs except the boot program. The downloaded control programs are stored in a random-access memory (RAM) of the printer. This makes it easy to cope with faults of the programs for controlling the printer and update the programs.

However, installing all the control programs for controlling the peripheral devices connectable to the printer requires an enormous amount of memory capacity, which increases the cost of the memory. Moreover, in the structure in which the ROM is changed according to the connected peripheral device, it is necessary to change the ROM every time a different peripheral device is connected, which is cumbersome.

Further, according to the art disclosed in Japanese Laid-open Patent Application No. 2000-207153, since the downloaded programs for controlling the printer are executed after stored in the RAM, the programs stored in the RAM vanish every time the printer is turned off. Therefore, it is necessary to download the programs for controlling the printer from the host computer every time the printer is turned on.

SUMMARY OF THE INVENTION

The present invention is made to solve the above-mentioned problem, and an object thereof is to provide an image forming apparatus with a reduced memory cost.

Another object of the present invention is to provide an image forming apparatus capable of easily updating the control program of the peripheral device.

Yet another object of the present invention is to provide an installation program, a computer-readable recording medium storing the installation program, and an installation method capable of reducing the memory cost of the image forming apparatus.

Still another object of the present invention is to provide an installation program, a computer-readable recording medium storing the installation program, and an installation method capable of easily updating the program for controlling the peripheral device of the image forming apparatus.

To attain the above-mentioned objects, according to an aspect of the present invention, an image forming apparatus comprises: a connection condition detecting portion for detecting a condition of connection with a peripheral device to the image forming apparatus; an identification information acquiring portion for acquiring identification information for identifying the peripheral device when the connection condition detecting portion detects that the peripheral device is connected; a control program receiving portion for transmitting the acquired identification information to a server connected to a network, and receiving a program for controlling the peripheral device from the server; a rewritable nonvolatile memory; and a writing portion for writing the received control program into the memory.

According to another aspect of the present invention, an installation program causes an image forming apparatus to execute steps of: detecting a condition of connection with a peripheral device; acquiring identification information for identifying the peripheral device when it is detected that the peripheral device is connected; transmitting the acquired identification information to a server connected to a network; receiving a program for controlling the peripheral device from the server; and storing the received control program into a rewritable nonvolatile memory.

According to yet another aspect of the present invention, an installation method comprising steps of: detecting a condition of connection with a peripheral device; acquiring identification information for identifying the peripheral device when it is detected that the peripheral device is connected; transmitting the acquired identification information to a server connected to a network; receiving a program for controlling the peripheral device from the server; and storing the received control program into a rewritable nonvolatile memory.

BRIEF DESCRIPTION OF THE DRAWINGS

These and other objects and features of this invention will become clear from the following description, taken in conjunction with the preferred embodiments with reference to the accompanied drawings in which:

FIG. 2 shows an example of the format of system requirements data of a paper ejector in the present embodiment;

FIG. 3 schematically shows the storage area of a memory of a controller of the printer in the present invention;

FIG. 4 schematically shows the storage area of a memory of an engine of the printer in the present embodiment;

DETAILED DESCRIPTION OF THE PREFERRED EMBODIMENTS

Figure 1:
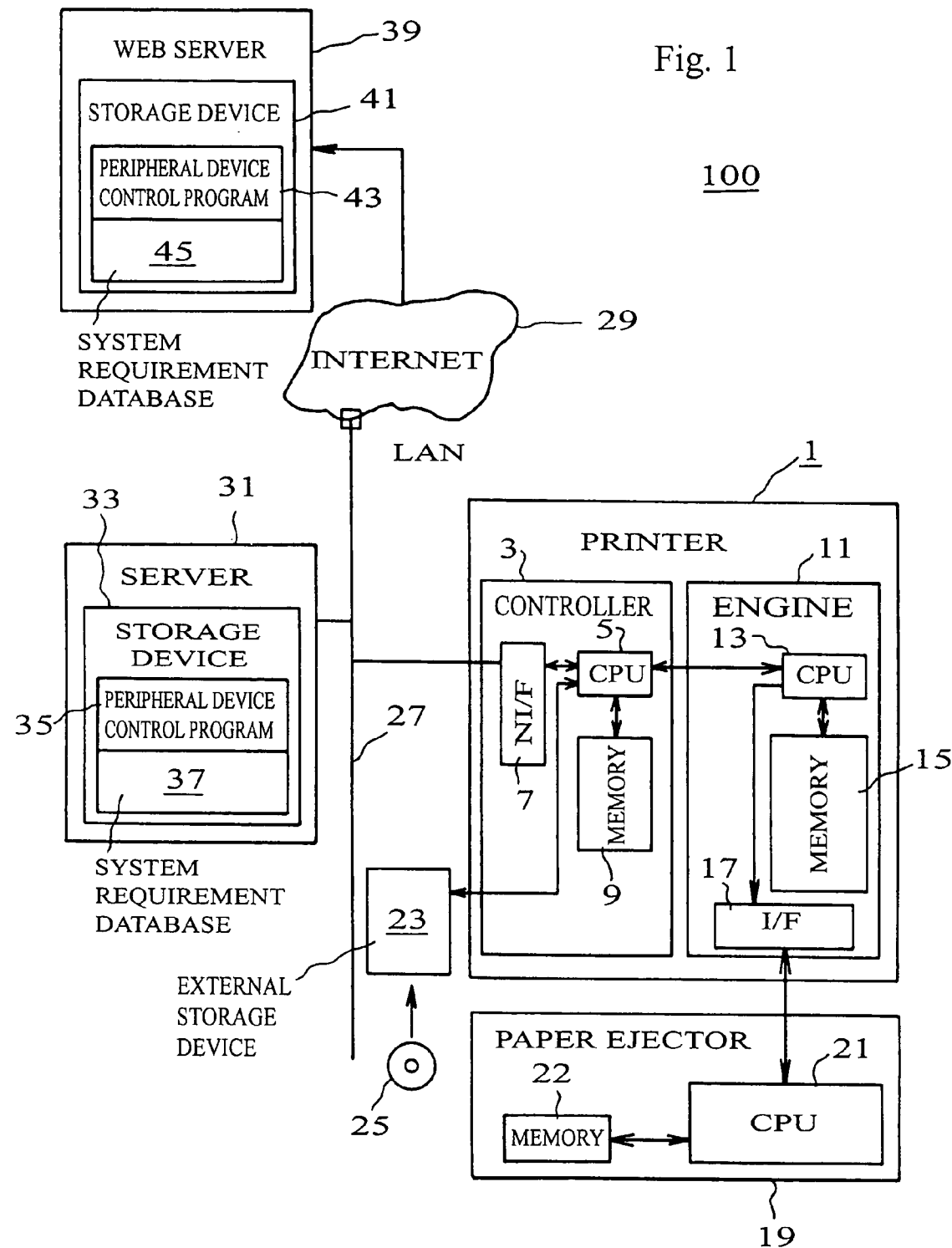
FIG. 1 is a block diagram schematically showing a printer system according to an embodiment of the present invention.

An embodiment of the present invention will be described with reference to the drawings. In the drawings, the same reference numbers designate the same or corresponding parts, and descriptions thereof are not repeated.

FIG. 1 is a block diagram schematically showing a printer system according to the embodiment of the present invention. Referring to FIG. 1, the printer system 100 includes a printer 1, a paper ejector 19 connectable to the printer 1, a computer 39 of a manufacturer of the printer 1 and the paper ejector 19 (hereinafter, referred to as "Web server 39"), and a computer 31 for managing the printer 1 (hereinafter, referred to as "server 31").

While the present embodiment is described with paper ejectors of a plurality of kinds such as a stapler and a sorter as an example of the peripheral device connectable to the printer 1, as the peripheral device, paper feeders of a plurality of kinds and image input devices of a plurality of kinds are applicable as well. Moreover, as the peripheral device, ones having a CPU that executes control programs and being capable of receiving control programs from the image forming apparatus are applicable.

The server 31 and the printer 1 are connected to a local-area network (LAN) 27. The Web server 39 of the printer manufacturer is connected to the Internet 29. The LAN 27 is connected to the Internet 29. Consequently, the server 31 and the printer 1 can communicate with each other through the LAN 27. Further, the printer 1 and the server 31 can communicate with the Web server 39 through the LAN 27 and the Internet 29.

The Web server 39 has a storage device 41 such as a hard disk. The storage device 41 includes an area 43 storing peripheral device control programs and an area 45 storing a system requirements database (a system environment database). The peripheral device control programs stored in the area 43 include a program for controlling, in a CPU 21 provided in the paper ejector 19 connected to the printer 1, various driving loads existing in the paper ejector 19. The peripheral device control programs include not only the program for controlling the driving loads in the paper ejector 19 but also a program for controlling, in a CPU provided in a different peripheral device connectable to the printer 1, various driving loads existing in the different peripheral device. Further, the peripheral device control programs include a program for controlling, in a CPU provided in a peripheral device connectable to a printer different in model from the printer 1, various driving loads existing in the peripheral device.

The system requirements database stored in the area 45 of the storage device 41 is system requirements data of each peripheral device connected to the printer. The system requirements data includes: apparatus information such as the printer name, the paper ejector name, the serial number and the firmware version; operation history information such as the number of operations and the driving time of each operation mode, the number of staplings and punchings, and error status information; and control information used when the control program is executed by the CPU 21 of the peripheral device.

The control information may include control parameters (adjust data such as the conveyance speed adjust value, the loop amount adjust value and the staple position adjust value), a control mode executed when the program is executed, a control mode not executed when the program is executed, a control mode executed prior to others when the program is executed, and the order of priority of the modes.

In the printer system 100 according to the present embodiment, the peripheral device is identified based on the model name and the serial number of the peripheral device. In the system requirements database, the system requirements data is stored being classified by peripheral device and serial number of the peripheral device.

As the control program, the same management method is used for the same kind of peripheral devices. However, since it is natural that deterioration with time, manufacturing errors and operation histories should be different among paper ejectors having different serial numbers, it is desirable to manage the system requirements data associated therewith for each paper ejector. Storing the system requirements data for each serial number enables the system requirements data to be used as management information at the time of maintenance by managing the data as the system requirements data particular to the paper ejector, and enables avoidance of an error status and mode setting suitable for each individual use condition by using the system requirements data as control information of each paper ejector.

The server 31 is connected to the LAN 27, and manages the printer 1. The server 31 includes a personal computer. The server 31 normally manages a predetermined number of printers connected to the LAN 27 according to a network management protocol such as the simple network management protocol (SNMP).

The server 31 has a storage device 33 such as a hard disk. The storage device 33 includes an area 35 storing peripheral device control programs and an area 37 storing a system requirements database. In the area 35 storing peripheral device control programs, peripheral device control programs are stored like in the storage device 41 of the Web server 39. While in the area 43 of the storage device 41, all the peripheral device control programs executed in the printers manufactured or sold by the printer manufacturer owning the Web server 39 are stored, in the area 35 of the storage device 33 of the server 31, it is sufficient if the peripheral device control programs executed in the printers connected to the LAN 27 are stored.

When a printer is newly connected to the LAN 27, the peripheral device control program for controlling the peripheral device connected to the newly connected printer is normally not stored in the area 35 of the storage device 33. When a printer is newly connected to the LAN 27, the server 31 accesses the Web server 39 as required and downloads the necessary peripheral device control program. The downloaded control program is stored into the area 35 of the storage device 33.

The network addresses and the directories of the peripheral device control programs stored in the Web server 39 are stored in a nonvolatile memory of the printer 1 in advance so that they are transmitted from the printer 1 to the server 31 in response to a request from the server 31 and are registered by the server 31.

In the area 37 of the storage device 33, a system requirements database is stored like in the area 45 of the storage device 41 of the Web server 39. However, in the area 37 of the storage device 33, it is sufficient to store only the system requirements data of the peripheral devices connected to the printers managed by the server 31. When a peripheral device is newly connected to the printer to be managed, there are cases where the system requirements data of the newly connected peripheral device is not stored in the area 37 of the storage device 33. When the system requirements data of the peripheral device is not stored, the server 31 accesses the Web server 39 and downloads the system requirements data of the peripheral device from the area 45 of the storage device 41 of the Web server 39. The downloaded data is stored in the area 37 of the storage device 33.

While only one Web server 39 is shown in FIG. 1, when the Web server of a different printer manufacturer is connected to the Internet 29, the server 31 is capable of downloading peripheral device control programs and system requirements data from the Web server of the different printer manufacturer and storing the downloaded programs and data into the areas 35 and 37 of the storage device 33.

The printer 1 includes a controller 3 and an engine 11. The controller 3 is connected to the LAN 27, and includes a network interface 7 (NI/F) for communicating with the server 31 or the Web server 39, a CPU 5 for controlling the entire controller 3 and a memory 9.

The controller 3 receives by the network interface 7 print data transmitted from another computer connected to the LAN 27 through the LAN 27. The CPU 5 produces image data from the print data received by the network interface 7, generates a video signal based on the produced image data, and transmits the generated video signal to the engine 11.

The engine 11 includes a CPU 13 for controlling the entire engine 11, a memory 15 for storing necessary information and an interface 17 for communicating with the paper ejector 19. The engine 11 forms an image on a recording medium such as paper based on the video signal received from the controller 3. The recording medium bearing the formed image is conveyed to the paper ejector 19.

The CPU 13 reads out the system requirements data of the paper ejector 19 stored in the memory 15, and controls various driving loads in the printer 1 in accordance with the system requirements data being read out.

The CPU 13 accepts an operation instruction to the paper ejector 19 based on an instruction input by the user from an input portion connected to the CPU 13. The input instruction to the paper ejector 19 is transmitted to the paper ejector 19 through the interface 17, and is received by the CPU 13 of the paper ejector 19. In this case, the CPU 13 executes a communication program, stored in the memory 15, for transmitting an operation instruction (a control instruction, and control information necessary when programs are executed by the CPU 21) to the CPU 21 of the paper ejector 19. By the CPU 13 executing the communication program stored in the memory 15, the operation instruction to the paper ejector 19 input from the input portion is transmitted to the CPU 21 of the paper ejector 19 through the interface 17, so that the CPU 21 of the paper ejector 19 operates in accordance with the received instruction.

Therefore, the communication program for controlling the paper ejector 19 is stored in the memory 15. The memory 15 which is rewritable and nonvolatile is capable of storing control programs even when the power is off. As the nonvolatile memory, for example, an electrically erasable programmable read-only memory (EEPROM) or a flash memory may be used.

The interface 17 relays transmission of identification information comprising the model name and the serial number of the paper ejector 19 from the CPU 21 to the CPU 13 or the CPU 5.

The interface 17 has a sensor for detecting whether the paper ejector 19 is connected to the printer 1 or not. As this sensor, for example, a mechanical switch that mechanically detects the connection may be used, or the connection may be checked by performing communication between the CPU 13 and the CPU 21 of the paper ejector 19.

The identification information of the paper ejector 19 may be detected by a sensor, provided in the interface 17, for detecting whether the paper ejector 19 is connected to the printer 1 or not. For example, sensor output signals corresponding to the positions and the number of conducting electrodes are output to the CPU 13 or the CPU 15 at a connector for connecting the paper ejector and the printer together.

The CPU 5 of the controller 3 is connected to an external storage device 23. The external storage device 23 is interpretable by the CPU 5 in the printer 1, reads in installation programs and data stored in a recording medium 25, and transmits the read program or data to the CPU 5. Moreover, necessary data is written onto the computer-readable recording medium 25 in response to an instruction from the CPU 5.

Examples of the computer-readable recording medium 25 include: tape media such as magnetic tapes and cassette tapes; magnetic disks such as flexible disks, hard disks and mini disks (MDs); optical disks such as CD-ROMs and DVDs; magneto-optical disks (MOs); storage media using a nonvolatile semiconductor memory such as IC cards, memory cards, optical cards, mask ROMs, erasable programmable read-only memories (EPROMs) and flash memories. Therefore, the external storage device 23 supporting each recording medium is prepared. The recording medium is not limited to a removable medium as mentioned above, but a recording medium fluidly carrying programs so that programs are downloaded from a network may be used.

The paper ejector 19 includes the CPU 21 for controlling the entire paper ejector 19, and a memory 22. The paper ejector 19 is controlled by the CPU 21, and executes driving control of various driving loads in the paper ejector 19 in response to an instruction transmitted from the CPU 13 of the engine 11 and causes predetermined operations to be performed. The predetermined operations include ejection and postprocessing. The ejection includes sheet sorting, conveyance of the sheet being used, ejection into an ejection slot selected from among a plurality of ejection slots, and change of the ejection direction. The postprocessing includes sorting and punching or stapling on a plurality of sheets being output.

The CPU 21 receives an instruction signal for the ejection and the postprocessing, and the paper ejector 19 performs a predetermined processing. The memory 22 stores a program (peripheral device program) performing the driving control of various driving loads in the paper ejector 19 which program is executed by the CPU 21, and control information used by the program.

When the paper ejector is turned on, the CPU 21 starts initial setting. In the initial setting, the program for controlling the driving loads in the paper ejector 19 which program is executed by the CPU 21 is loaded from the memory 15 of the engine, and transmission and reception of various pieces of control information are performed through communication with the CPU 13 of the engine. Transmission and reception of the control information in the system requirements data mentioned later are also performed in the initial setting. Then, the necessary control information is stored into the memory 22 for update. The CPU 21 also transmits to the CPU 13 the serial number and the model name of the paper ejector 19 mentioned later or the driving condition data of various driving loads in the paper ejector 19 in response to an instruction from the CPU 13, overwrites the memory 21 with the program (peripheral device control program) performing the driving control of various driving loads in the paper ejector 19 received from the CPU 13 through the interface 17 and the control information used by the program, and performs the driving control of various driving loads in the paper ejector 19 in response to an operation instruction from the CPU 13.

In the CPUs 13 and 21, while the control operation by each individual control program is performed, control pursuant to the above-mentioned system requirements data of the paper ejector 19 is performed. Specifically, a control execution mode pursuant to the control information and the management information in the system requirements data is set, and control with a control parameter is executed. For example, for the conveyer in the printer on the paper conveyance path from the printer 1 to the paper ejector and the conveyer in the paper ejector, a conveyance parameter setting (for example, the conveyance speed, the conveyance timing, and the jam timer) optimum for the conveyers to co-operate with each other is present. When stapling errors on thick paper frequently occur in the printer 1, it can be handled by inhibiting the combination mode. The control program is executed by use of such control information.

FIG. 2 shows an example of the format of the system requirements data of the paper ejector 19 in the present embodiment. Referring to FIG. 2, the system requirements data includes the model name, the serial number, the firmware version, the operation history and the control information. The operation history has items such as the number of operations and the error status for each operation mode. In the figure, the number of operations and the error status are shown for each of two operation modes A and B. Therefore, the system requirements data is data such that when the serial number and the model name are identified, the historical data of the paper ejector identified by the serial number and the model name is derived.

The control information includes control parameters and control modes. The control parameters are adjust data such as the conveyance speed adjust value, the loop amount adjust value and the staple position adjust value. The control modes are a control mode executed when the program is executed, a control mode not executed when the program is executed, a control mode executed prior to others when the program is executed, and the order of priority of the modes.

When the paper ejector 19 is connected to the printer 1, the system requirements data is stored in the memory 15 of the printer 1. When the paper ejector 19 has the memory 22, the system requirements data may be stored in the memory 22. When the paper ejector 19 is disconnected from the printer 1, the system requirements data is transmitted to the server 31 or the Web server 39 through the network interface 7, and stored in the storage device 33 of the server 31 or the storage device 41 of the Web server 39.

FIG. 3 schematically shows the storage area of the memory 9 of the controller of the printer 1. In the memory 9, programs executed by the CPU 5 are stored. The memory 9 may be a ROM because programs that are not necessarily updated are stored therein as described later. A rewritable memory such as an EEPROM or a flash memory may be used as the memory 9 so that the stored programs can be updated.

Referring to FIG. 3, the memory 9 includes the following areas: an area 51 storing an image processing program for performing image processing on the print data received through the network interface 7; an area 52 storing a program of an interface with a server for communicating with the server 31 or the Web server 39; an area 53 storing a transmission program for transmitting information such as the product name of the printer 1 or the serial number of the printer 1 through the network interface 7; an area 54 storing a firmware download program for downloading a control program (firmware) for controlling the paper ejector 19 by the server 31 or the Web server 39; an area 55 storing a system requirements data transmission and reception program for transmitting and receiving the system requirements data; an area 56 storing an image data transmission and reception program for transmitting and receiving image data; an area 57 storing status transmission and reception program for transmitting and receiving the status information of the printer 1; and an area 58 storing a program for controlling an engine interface for communicating with the engine 11; and an area 59 storing other programs.

The image processing program stored in the area 51 is for performing a predetermined image processing such as smoothing, color correction or sharpness correction on the print data received from another personal computer or the like connected to the LAN 27 through the network interface 7.

The program stored in the area 52 is for communicating with the server 31 or the Web server 39 through the LAN 27 or the Internet 29. This program is for controlling the network interface 7.

The program stored in the area 53 is for transmitting information such as the model name or the serial number of the printer 1 to the server 31 or the Web server 39 through the network interface 7.

The program stored in the area 54 is for downloading the peripheral device control program stored in the storage device 33 of the server 31 or the peripheral device control program stored in the storage device 41 of the Web server 39.

The program stored in the area 55 is for transmitting the system requirements data of the paper ejector 19 stored in the memory 15 or the memory 22 of the paper ejector 19 to the server 31 or the Web server 39, or for receiving the system requirements data of the paper ejector connected to the printer 1 which data is stored in the storage device 33 of the server 31 or the storage device 41 of the Web server 39.

The image data transmission and reception program stored in the area 56 is for receiving and transmitting print data (image data) from and to another personal computer or the like connected to the LAN 27 through the network interface 7.

The status transmission and reception program stored in the area 57 is for transmitting and receiving the status information of the printer 1, for example, information such as the operating time of the printer 1, the number of copies, the number of failures and the failure code to and from the server 31 through the network interface 7.

The program stored in the area 58 is for controlling the engine interface for communicating with the CPU 13 of the engine 11.

FIG. 4 schematically shows the storage area of the memory 15 of the engine 11 of the printer 1 in the present embodiment. In the memory 15 of the engine 11, programs executed by the CPU 13 of the engine 11 are stored. The memory 15 is rewritable and nonvolatile.

Referring to FIG. 4, the memory 15 includes the following areas: an area 61 storing an engine control program; an area 62 storing an interface program for communicating with the paper ejector 19; an area 63 storing a program for controlling various driving loads in the paper ejector 19 by the CPU 21 in the paper ejector 19 (hereinafter, this program will be referred to as "control program executed by the CPU 21 of the paper ejector 19"); an area 64 storing a controller interface program for communicating with the CPU 5 of the controller 3; an area 65 storing the system requirements data of the paper ejector 19; and an area 66 storing other programs.

The previously mentioned communication program is stored in the memory 15 although not shown in FIG. 4.

The engine control program stored in the area 61 is for controlling the engine 11. The engine 11 has an image forming portion for forming an image on a recording medium such as a sheet based on the print data received from the CPU 5. The engine control program is for controlling the image forming portion.

The control program stored in the area 63 is executed by the CPU 21 of the paper ejector 19. The control program is downloaded from the server 31 or the Web server 39 and stored into the area 63 at the point of time when the paper ejector 19 is connected to the printer 1.

In the area 64, the system requirements data of the paper ejector 19 is stored. When the paper ejector 19 has the memory 22 and the system requirements data is stored in the memory 22, the area 64 is unnecessary.

Figure 5:
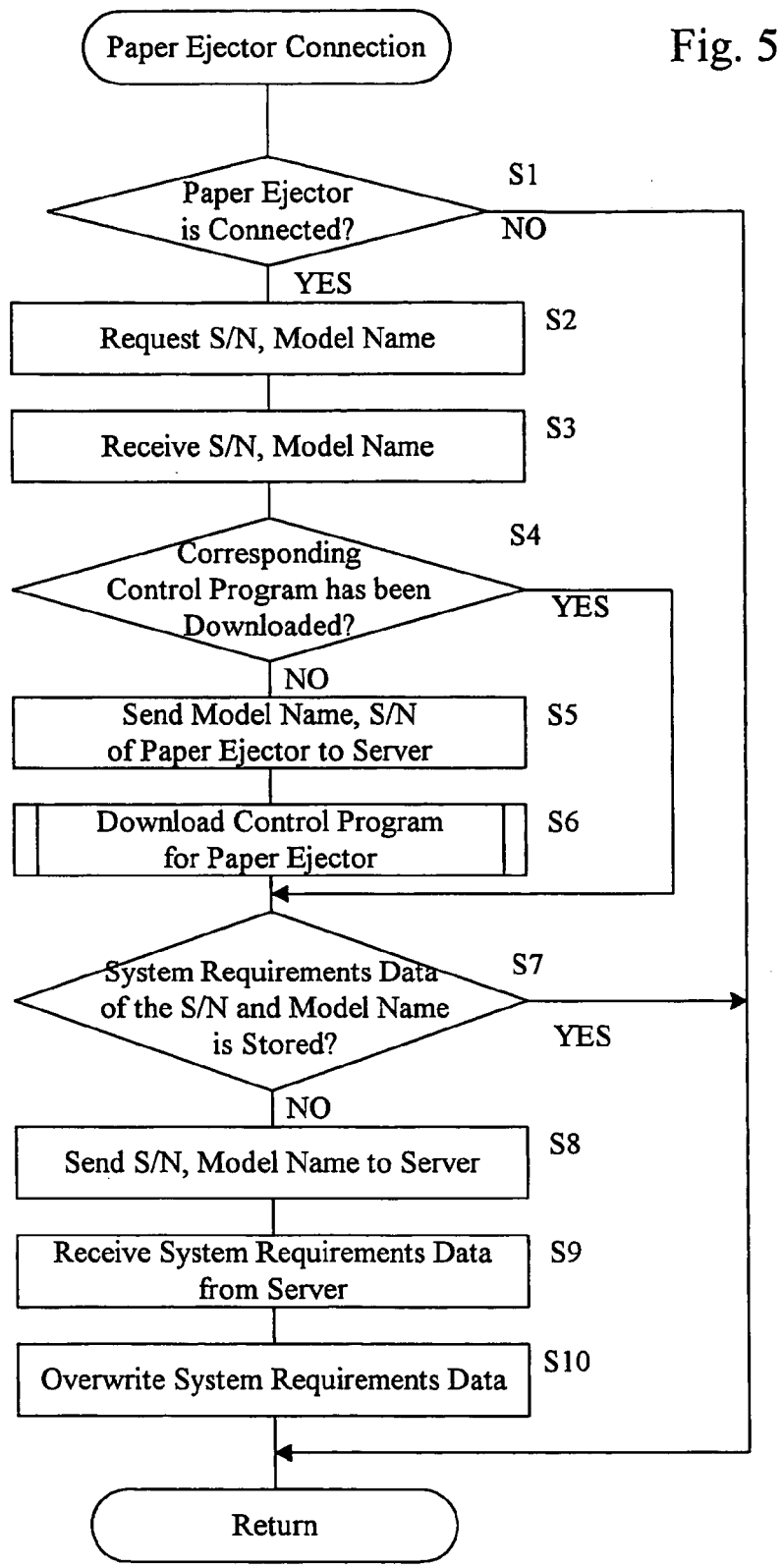
FIG. 5 is a flowchart of a paper ejector connection processing performed in the printer in the present embodiment.

FIG. 5 is a flowchart of a paper ejector connection processing performed by the CPU 13 of the engine 11 and stored in the external storage device 23 or the memory 15 in the present embodiment. Referring to FIG. 5, in the printer 1, whether the paper ejector 19 is connected or not is determined (step S1). Whether the paper ejector 19 is connected or not can be detected by the mechanical switch or by performing communication between the CPU 13 of the engine 11 and the CPU 21 of the paper ejector 19. When it is determined that the paper ejector 19 is connected to the printer 1, the process proceeds to step S2. When the paper ejector 19 is not connected, the processing is ended.

At step S2, the printer 1 transmits to the paper ejector 19 a signal requesting the serial number (S/N) and the model name from the paper ejector 19. This request is made by performing communication between the CPU 13 of the engine 11 and the CPU 21 of the paper ejector 19 through the interface 17 of the engine 11. Receiving the request signal from the printer 1, the paper ejector 19 transmits to the printer 1 the model name and the serial number of the paper ejector 19 stored in the memory 22.

The printer 1 receives the serial number and the model name transmitted from the paper ejector 19 through the interface 17 (step S3). Then, based on the received model name and serial number, it is determined whether the control program corresponding to the received model name and serial number has already been downloaded in the memory 15 or not (step S4). Whether the control program has been downloaded or not is determined based on whether the corresponding control program is stored in the memory 15 or not. When the corresponding control program is stored in the memory 15, the process proceeds to step S7. When the corresponding control program is not stored, the process proceeds to step S5.

At step S5, to download the control program executed by the CPU 21 of the paper ejector 19 from the server 31, a command requesting the model name and the serial number of the paper ejector 19 and transmission of the control program is transmitted to the server 31 through the CPU 5 of the controller 3 and the network interface 7. When the control program executed by the CPU 21 of the paper ejector 19 is determined by the printer and the paper ejector, the model name of the printer is transmitted to the server 31 together with the command requesting transmission of the control program.

As described later, receiving from the printer 1 the command requesting the model name and the serial number of the paper ejector and transmission of the control program, the server 31 determines whether the corresponding control program is stored in the area 35 of the storage device 33 or not. When the corresponding control program is stored, the program is read out from the storage device 33 and transmitted to the printer 1.

When the corresponding control program is not stored in the storage device 33, the command requesting the model name and the serial number of the paper ejector and transmission of the control program is transmitted from the server 31 to the Web server 39. The Web server 39 reads out the control program stored in the storage device 41 based on the received model name and serial number of the paper ejector, and transmits it to the server 31. The server 31 stores the received control program into the area 35 of the storage device 33. Consequently, the control program corresponding to the model name and the serial number of the paper ejector received from the printer 1 is stored in the storage device 33. Then, the stored control program is read out and transmitted to the printer 1.

As described above, even when the control program corresponding to the model name and the serial number of the paper ejector is not stored in the storage device 33 of the server 31, the corresponding control program can be downloaded into the storage device 33 of the server 31 by accessing the Web server 39 of the printer manufacturer.

In this manner, the control program for controlling the paper ejector is downloaded into the printer 1 from the server 31 (step S6). The area 63 of the memory 15 of the engine 11 is overwritten with the downloaded control program. The memory 15 is rewritable and nonvolatile. Therefore, even when the printer 1 is off, the control program stored in the memory 15 is maintained. Since the memory 15 is rewritable, the area 63 is overwritten with the downloaded control program. Consequently, only the control program executed by the CPU 21 of the paper ejector 19 connected to the printer 1 is stored in the area 63.

When the memory 15 is overwritten with the control program, the CPU 13 instructs the CPU 21 to transmit the control program to the paper ejector 19 and to overwrite the memory 22 with the control program.

The storage area 63 has a capacity sufficient for storing only the program controlling one peripheral device. When the connected peripheral device is changed, only the program controlling the peripheral device is stored at that time.

Then, it is determined whether the system requirements data of the paper ejector 19 is stored in the memory 15 of the engine 11 or not. The system requirements data is stored so as to be associated with the model name and the serial number of the paper ejector 19. Therefore, it is determined whether the system requirements data corresponding to the serial number and the model name received at step S3 is stored in the memory 15 or not. When the data is stored, the processing is ended. When the data is not stored, the process proceeds to step S8.

At step S8, the serial number and the model name of the paper ejector 19 and the system requirements data request command are transmitted to the server 31 through the CPU 5 of the controller 3 and the network interface 7.

Receiving the serial number, the model name and the system requirements data request command, the server 31 determines whether the corresponding system requirements data is stored in the area 37 of the storage device 33 or not. This determination is made by use of the received serial number and model name. When determining that the system requirements data corresponding to the serial number and the model name is not stored in the storage device 33, the server 31 transmits the received serial number, model name and system requirements data request command to the Web server 39. Receiving the serial number, the model name and the system requirements data request command, the Web server 39 determines whether the corresponding system requirements data is stored in the area 45 of the storage device 41 or not. When it is determined that the system requirements data is stored, the corresponding system requirements data is read out from the storage device 41 and transmitted to the server 31. In the server 31, the received system requirements data is stored in the storage device 33 so as to be associated with the serial number and the model name. Consequently, the system requirements data corresponding to the serial number and the model name received from the printer 1 is stored in the storage device 33 of the server 31. The server 31 transmits to the printer 1 the system requirements data corresponding to the serial number and the model name stored in the storage device 33.

The printer 1 receives the system requirements data from the server 31 (step S9). The area 65 of the memory 15 of the engine 11 is overwritten with the received system requirements data (step S10). Consequently, the latest system requirements data of the paper ejector 19 connected to the printer 1 is stored in the memory 15 of the printer 1.

Since the memory 15 is rewritable and nonvolatile, the area 65 is overwritten with the received system requirements data. Consequently, only the system requirements data of the paper ejector 19 connected to the printer 1 is stored in the area 65.

When the memory 15 is overwritten with the system requirements data, the CPU 13 instructs the CPU 21 to transmit, of the system requirements data, the control information used for executing this control program and to overwrite the memory 22 with the system requirements data.

While in the present embodiment, the control program and the system requirements data of the paper ejector 19 are stored in the memory 15 of the printer 1, the control program and the system requirements data may be stored in the memory 22 of the paper ejector 19.

Figure 6:
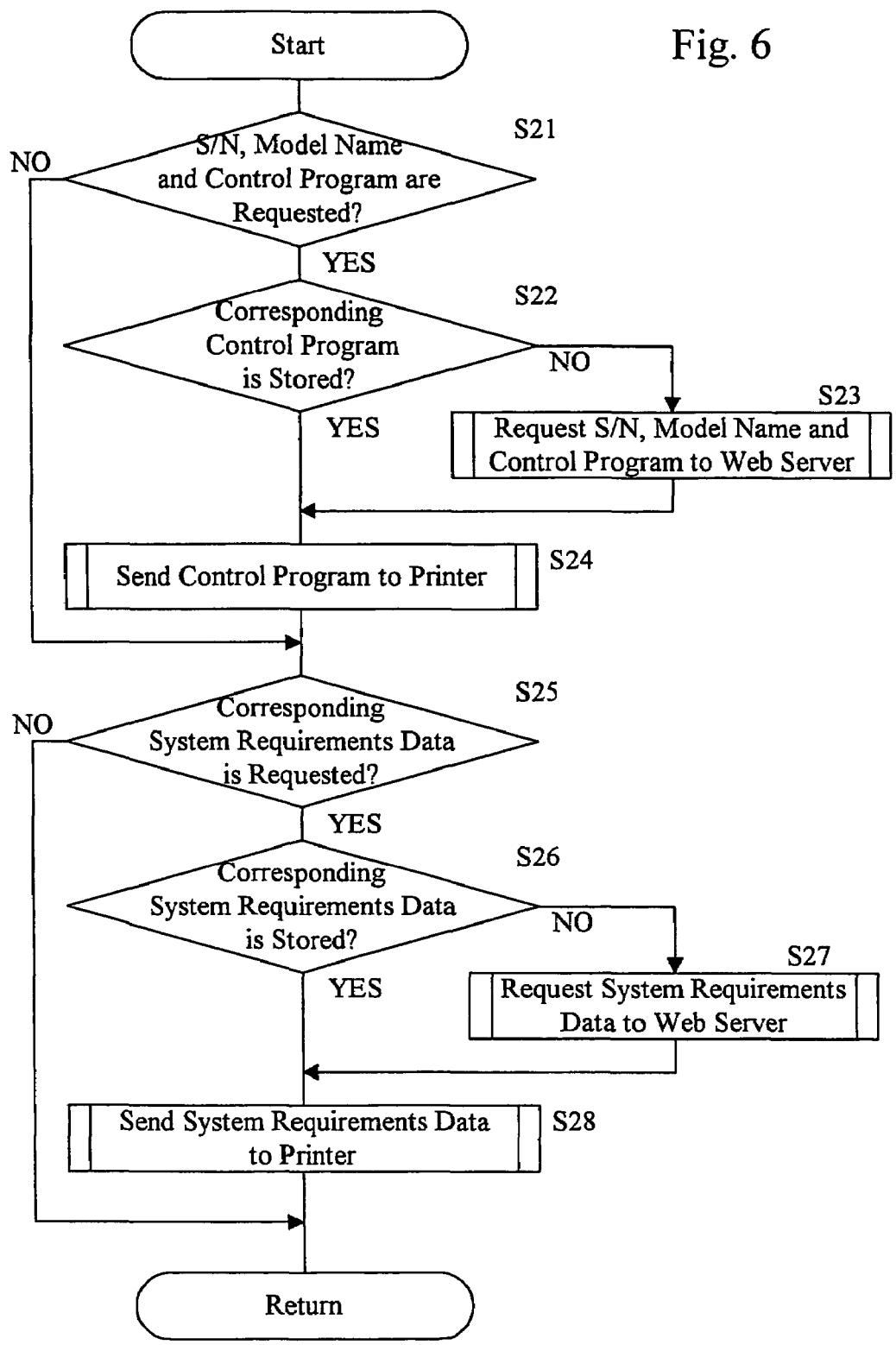
FIG. 6 is a flowchart of a processing performed in a server in the present embodiment.

FIG. 6 is a flowchart of a processing performed in the server 31 in the present embodiment. Referring to FIG. 6, the server 31 determines whether the command requesting the model name and the serial number of the paper ejector and transmission of the control program is received from the printer 1 or not (step S21). When the transmission request is received, the process proceeds to step S22. When the transmission request is not received, the process proceeds to step S25. When the control program varies among the models of the printer 1, the model name of the printer 1 is also received.

At step S22, it is determined whether the control program corresponding to the model name and the serial number of the paper ejector received at step S21 is stored in the area 35 of the storage device 33 or not. When the control program is stored, the process proceeds to step S24. When the control program is not stored, the process proceeds to step S23.

At step S23, the command requesting the serial number and the model name of the paper ejector 19 and transmission of the control program which command is received at step S21 is transmitted to the Web server 39. Then, the control program corresponding to the transmitted serial number and model name of the paper ejector 19 is received from the Web server 39. The received control program is stored into the area 35 of the storage device 33. When the control program varies among the models of the printer 1, the model name of the printer 1 is transmitted together with the command requesting transmission of the control program.

Then, at step S24, the control program stored in the storage device 33 of the server 31 is transmitted to the printer 1.

At the next step S25, it is determined whether a request for the system requirements data is made by the printer 1 or not. Whether the request for the system requirements data is made or not is determined based on whether a command requesting the serial number and the model name of the paper ejector 19 and transmission of the system requirements data is received from the printer 1 or not. When the request for the system requirements data is made, the process proceeds to step S26. When the request is not made, the processing is ended.

At step S26, it is determined whether the system requirements data corresponding to the serial number and the model name received at step S25 is stored in the area 37 of the storage device 33 of the server 31 or not. When the system requirements data is stored, the process proceeds to step S28. When the data is not stored, the process proceeds to step S27.

At step S27, a processing to request the system requirements data from the Web server 39 is performed. This processing is to transmit from the server 31 to the Web server 39 the command requesting the model name, the serial number and transmission of the system requirements data which command is received at step S21. Consequently, the Web server 39 reads out the system requirements data corresponding to the received serial number and model name of the paper ejector 19 from the area 45 of the storage device 41, and transmits it to the server 31.

The server 31 receives the system requirements data corresponding to the serial number and the model name received at step S21, and stores the received system requirements data into the area 37 of the storage device 33 so as to be associated with the serial number and the model name.

At step S28, the system requirements data corresponding to the serial number and the model name received at step S21 is read out from the area 37 of the storage device 33, and transmitted to the printer 1.

Figure 7:
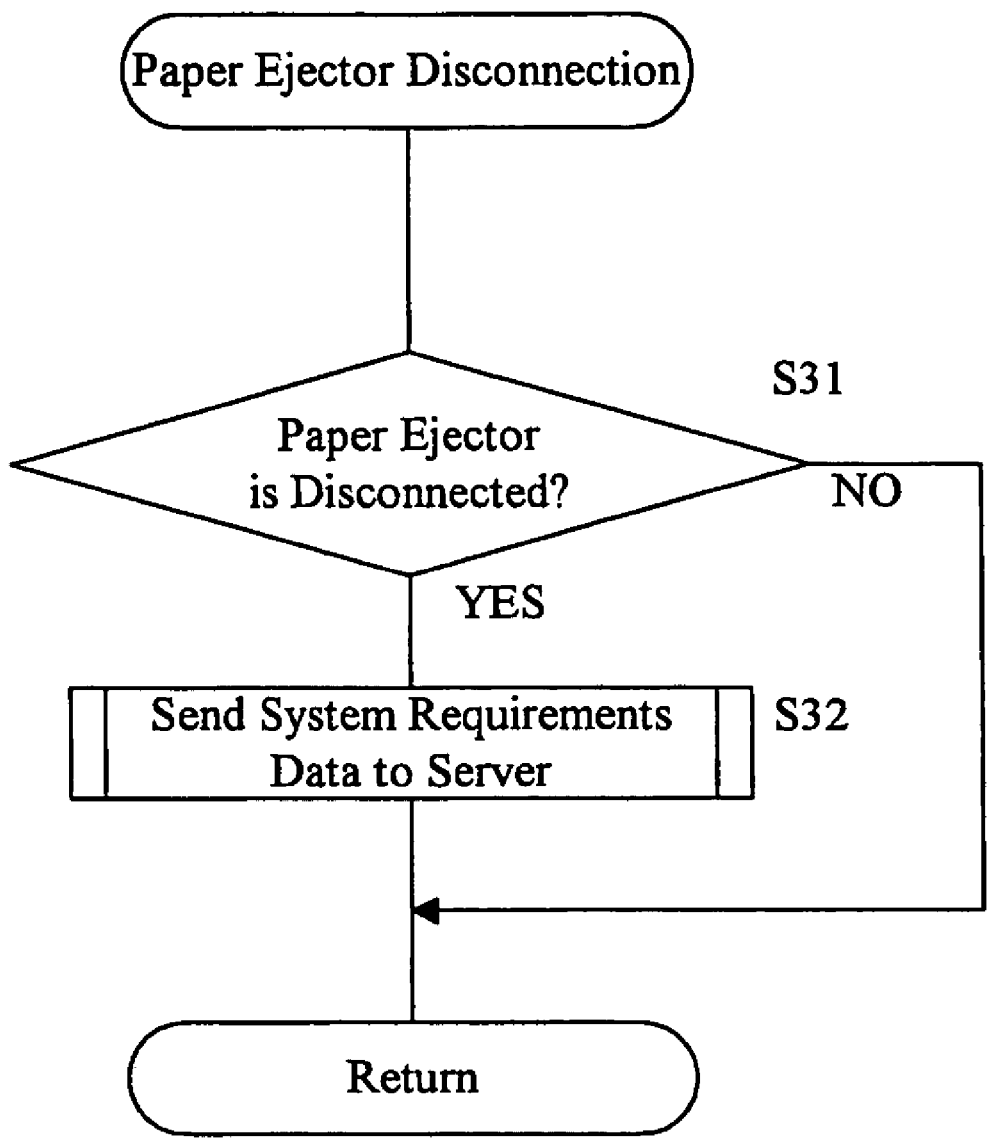
FIG. 7 is a flowchart of a paper ejector disconnection processing performed in the printer in the present embodiment.

FIG. 7 is a flowchart of a paper ejector disconnection processing performed by the CPU 13 of the engine 11 and stored in the external storage device 23 or the memory 15 in the present embodiment. Referring to FIG. 7, in the disconnection processing, first, it is detected whether the paper ejector 19 is disconnected from the printer 1 or not (step S31). This detection may be made by the mechanical switch or by detecting that communication between the CPU 13 of the engine 11 of the printer 1 and the CPU 21 of the paper ejector 19 cannot be performed. When the disconnection is detected, the process proceeds to step S32. When the disconnection is not detected, the processing is ended.

At step S32, the system requirements data of the paper ejector 19 stored in the memory 15 is transmitted to the server 31 through the network interface 7 together with the model name and the serial number of the paper ejector 19. The server 31 stores the received system requirements data into the area 37 of the storage device 33 so as to be associated with the serial number and the model name.

Since this makes the area 65 of the memory 15 erasable or overwritable, the area 65 of the memory 15 can be used for storing the system requirements data of another paper ejector.

As described above, in the printer system according to the present embodiment, in the printer 1, in a case where the control program for controlling the paper ejector 19 is not stored in the memory 15 at the point of time when it is detected that the paper ejector 19 is connected, the control program is downloaded from the server 31 and stored into the memory 15. Since the memory 15 is nonvolatile, even when the printer 1 is off, the control program for controlling the paper ejector 19 is maintained in the memory 15. Therefore, it is unnecessary to download the control program for controlling the paper ejector 19 from the server 31 every time the printer 1 is turned off.

When a peripheral device different from the paper ejector 19 is connected to the printer 1, the program for controlling the peripheral device is downloaded from the server 31, and the storage area 63 is overwritten with the control program. Consequently, the storage area 63 may have a comparatively small capacity sufficient for storing only the control program controlling one peripheral device. Consequently, the memory 15 can effectively be used, so that the memory capacity required of the printer 1 can be reduced.

Further, in the printer 1, every time the paper ejector 19 is connected, the system requirements data of the paper ejector 19 is downloaded from the server 31 and stored into the memory 15. When the paper ejector 19 is disconnected from the printer 1, the system requirements data of the paper ejector 19 stored in the memory 15 of the printer 1 is transmitted to the server 31. Consequently, even when the paper ejector 19 is one used being connected to a different printer, the history of its use in the different printer can continuously be used by the printer 1. Consequently, the history of use of the paper ejector 19 can accurately be managed when the paper ejector 19 is used in any printer.

While various driving loads existing in the paper ejector 19 are controlled by the CPU 21 of the paper ejector 19 in the above-described embodiment, the driving loads in the paper ejector 19 may be controlled by the CPU 13 of the engine 11.

As described above, since it is unnecessary to store the programs controlling peripheral devices not being connected and it is necessary to store only the program for controlling the connected peripheral device, it is necessary only to provide a memory of a capacity capable of storing the control program of the largest size. Consequently, an image forming apparatus with a reduced memory cost can be provided.

Moreover, since the control program of the latest version can be stored even when the program controlling a peripheral device is updated, the control program of the peripheral device can easily be updated.

The embodiment disclosed herein should be considered illustrative and not restrictive in all respects. The scope of the invention is defined by the appended claims rather than by the description preceding them, and all changes that fall within equivalence of meanings and bounds of the claims are therefore intended to be embraced by the claims.

What is claimed is:

1. An image forming apparatus comprising:
   a connection condition detecting portion for detecting a condition of connection with a peripheral device to the image forming apparatus;
   an identification information acquiring portion for acquiring identification information for identifying the peripheral device when the connection condition detecting portion detects that the peripheral device is connected;
   a control program receiving portion for transmitting the acquired identification information to a server connected to a network, and receiving a program for controlling the peripheral device from the server;
   a rewritable nonvolatile memory;
   a writing portion for writing the received control program into the memory; and
   transmitting portion for transmitting to the server the received identification information and the system requirements data stored in the memory when the connection condition detecting portion detects that the connected peripheral device is disconnected,
   wherein the control program receiving portion receives system requirements data of the peripheral device together with the control program, and the writing portion writes the received system requirements data into the memory, and
   wherein the writing portion writes the system requirements data of the peripheral device detected to be connected, into an area in which system requirements data of the disconnected peripheral device is stored.

2. The image forming apparatus as claimed in claim 1, wherein the writing portion writes the control program of the peripheral device detected to be connected, into an area of the memory in which a control program of another peripheral device having already been disconnected is stored.

3. The image forming apparatus as claimed in claim 1, wherein the system requirements data includes at least product information, operation history information and control information.

4. The image forming apparatus as claimed in claim 1, further comprising:
   an operation detecting portion for detecting an operation of the connected peripheral device; and
   an updating portion for updating the system requirements data stored in the memory in accordance with the detected operation.

5. The image forming apparatus as claimed in claim 1, further comprising a controlling portion for executing the control program written in the memory,
   wherein the controlling portion executes a control corresponding to the stored system requirements data.

6. The image forming apparatus as claimed in claim 1, further comprising a system requirements data transmitting portion for transmitting the stored system requirements data to the peripheral device detected to be connected.

7. The image forming apparatus as claimed in claim 1, wherein the acquiring portion acquires the identification information from the peripheral device.

8. An installation program for causing an image forming apparatus to execute steps of:
   detecting a condition of connection with a peripheral device;
   acquiring identification information for identifying the peripheral device when it is detected that the peripheral device is connected;

transmitting the acquired identification information to a server connected to a network;

receiving a program for controlling the peripheral device from the server;

storing the received control program into a rewritable nonvolatile memory; and transmitting to the server the detected identification information and the system requirements data stored in the memory when it is detected that the connected peripheral device is disconnected in the step of detecting the condition of connection, wherein in the step of receiving the control program, system requirements data of the peripheral device is received together with the control program, and in the storing step, the received system requirements data is stored, and wherein in the storing step, the system requirements data of the peripheral device detected to be connected is stored into an area in which system requirements data of the disconnected peripheral device is stored.

9. The installation program as claimed in claim 8, wherein in the storing step, the control program of the peripheral device detected to be connected is stored into an area of the memory in which a control program of another peripheral device having already been disconnected is stored.

10. A computer-readable recording medium storing an installation program as claimed in claim 8.

11. An installation method comprising steps of:

detecting a condition for connection with a peripheral device;

acquiring identification information for identifying the peripheral device when it is detected that the peripheral device is connected;

transmitting the acquired identification information to a server connected to a network;

receiving a program for controlling the peripheral device from the server;

storing the received control program into a rewritable nonvolatile memory; and transmitting to the server the detected identification information and the system requirements data stored in the memory when it is detected that the connected peripheral device is disconnected in the step of detecting the condition of connection, wherein in the step of receiving the control program, system requirements data of the peripheral device is received together with the control program, and in the storing step, the received system requirements data is stored, and wherein in the storing step, the system requirements data of the peripheral device detected to be connected is stored into an area in which system requirements data of the disconnected peripheral device is stored.

12. The installation method as claimed in claim 11, wherein in the storing step, the control program of the peripheral device detected to be connected is stored into an area of the memory in which a control program of another peripheral device having already been disconnected is stored.

* * * * *